United States Patent
Walcher et al.

(10) Patent No.: US 12,076,796 B2
(45) Date of Patent: Sep. 3, 2024

(54) DRILLING TOOL

(71) Applicant: CERATIZIT BALZHEIM GMBH & CO. KG, Balzheim (DE)

(72) Inventors: Rainer Walcher, Balzheim (DE); Nordine Bensadi, Balzheim (DE)

(73) Assignee: Ceratizit Balzheim GmbH & Co. KG, Balzheim (DE)

( * ) Notice: Subject to any disclaimer, the term of this patent is extended or adjusted under 35 U.S.C. 154(b) by 291 days.

(21) Appl. No.: 17/413,644

(22) PCT Filed: Nov. 27, 2019

(86) PCT No.: PCT/EP2019/082747
§ 371 (c)(1),
(2) Date: Jun. 14, 2021

(87) PCT Pub. No.: WO2020/120138
PCT Pub. Date: Jun. 18, 2020

(65) Prior Publication Data
US 2022/0072629 A1    Mar. 10, 2022

(30) Foreign Application Priority Data
Dec. 13, 2018  (EP) .................................. 18212364

(51) Int. Cl.
*B23B 51/02*    (2006.01)

(52) U.S. Cl.
CPC .................................. *B23B 51/02* (2013.01)

(58) Field of Classification Search
CPC ..... B23B 51/02; B23B 51/06; B23B 2251/02; B23B 2251/406; B23B 2251/40;
(Continued)

(56) References Cited

U.S. PATENT DOCUMENTS

| 5,312,209 A | * | 5/1994 | Lindblom | B23B 51/02 |
| | | | | 408/230 |
| 5,350,261 A | * | 9/1994 | Takaya | B23B 51/02 |
| | | | | 408/229 |

(Continued)

FOREIGN PATENT DOCUMENTS

| DE | 69209034 T2 | 7/1996 |
| DE | 69709966 T2 | 10/2002 |

(Continued)

OTHER PUBLICATIONS

Drozda et al., Tool and Manufacturing Engineers Handbook, 1983, Society of Manufacturing Engineers, Fourth Edition, vol. 1, Chapter 9, pp. 9-14 to 9-15 (Year: 1983).*

*Primary Examiner* — Nicole N Ramos
(74) *Attorney, Agent, or Firm* — Laurence A. Greenberg; Werner H. Stemer; Ralph E. Locher

(57) ABSTRACT

A drilling tool, in particular a twist drill, has a substantially cylindrical main body formed with a shank portion, a cutting-edge portion having a drill diameter, and a drill end. The drilling tool is rotatable in a direction of rotation about a drill longitudinal axis. At least two flutes extend in a twisted manner along the drill longitudinal axis and are inclined with at least one helix angle. The flutes form a chip space. Webs are formed between the flutes with a web width. The chip space is formed with a chip space extension that enlarges the chip space in at least part of at least one of the flutes. The web width is reduced in the region of the chip space extension.

13 Claims, 4 Drawing Sheets

(58) Field of Classification Search
CPC ........... B23B 2251/443; B23B 2251/241–245;
B23B 2251/046; B23B 2251/043
See application file for complete search history.

(56) References Cited

U.S. PATENT DOCUMENTS

| | | | |
|---|---|---|---|
| 5,678,960 | A | 10/1997 | Just et al. |
| 5,800,101 | A | 9/1998 | Jindai et al. |
| 6,315,504 | B1* | 11/2001 | Sekiguchi ............... B23B 51/02 408/229 |
| 7,306,411 | B2 | 12/2007 | Mabuchi et al. |
| 7,740,426 | B2* | 6/2010 | Yamamoto .............. B23B 51/02 408/230 |
| 9,333,565 | B2* | 5/2016 | Volokh ...................... B23C 5/12 |
| 2004/0101379 | A1* | 5/2004 | Mabuchi ................. B24B 19/04 408/230 |
| 2005/0053438 | A1* | 3/2005 | Wetzl ...................... B23B 51/02 408/225 |
| 2008/0298918 | A1* | 12/2008 | Brink ...................... B23B 51/02 408/230 |

FOREIGN PATENT DOCUMENTS

| | | |
|---|---|---|
| EP | 1396303 A2 | 3/2004 |
| JP | 2004090196 A | 3/2004 |
| JP | 2006326752 A | 12/2006 |
| WO | 9504624 A1 | 2/1995 |

* cited by examiner

DRILLING TOOL

BACKGROUND OF THE INVENTION

Field of the Invention

The present invention relates to a drilling tool, in particular a twist drill, having a substantially cylindrical main body, comprising a shank portion, a cutting-edge portion having a drill diameter, a drill end, a drill longitudinal axis about which the drilling tool is rotatable in a direction of rotation, at least two flutes that extend in a twisted manner along the drill longitudinal axis in a manner inclined at, at least one helix angle, which flutes form a chip space, webs formed between the flutes with a web width, wherein a chip space extension for enlarging the chip space has been introduced into at least part of at least one of the flutes.

Generic drilling tools, in particular twist drills, comprise a cylindrical main body on which webs and, between the webs, flutes are formed in a helical manner. The angle at which the flutes extend in an inclined manner with respect to a central axis of the twist drill is the helix angle (also referred to as spiral angle) of the twist drill. The helix angle can be variable along the length of the twist drill.

As a rule, twist drills have two helical flutes.

The flutes allow chips to be transported away.

It is known from the prior art to enlarge the flutes of a drilling tool by grinding.

A chip space extension created in this way creates additional volume for receiving and transporting away chips. Chip space extension means generally that a free cross section of a flute is enlarged compared with the actual tool grinding.

SUMMARY OF THE INVENTION

The object of the present invention is to specify an improved drilling tool.

The object is achieved by a drilling tool as claimed. Advantageous developments are specified in the dependent claims.

The drilling tool according to the invention is configured such that the chip space extension encroaches on a web such that a web width is reduced in the region of the chip space extension. In other words, the chip space of the tool is enlarged at the cost of the web. The web is thus narrower in the region of the chip space extension than in a portion of the drilling tool in which a chip space extension is not formed.

Chip space extensions from the prior art are in the form of local recesses in flutes at the bottom thereof. The creation of additional chip space by known chip space extensions is limited as a result, since the supporting cross section of the drilling tool, i.e. the core diameter, is weakened.

By contrast, a chip space extension according to the invention extends a chip space laterally in that a web width is reduced. In addition, it is of course also possible for further chip space to be created by recessing the flute at its bottom.

The chip space extension according to the invention favors the transporting away of chips. A tendency to clog is reduced.

Preferably, chip space extensions are formed on all flutes of the drilling tool. It is, of course, also possible for a chip space extension to be formed only on one flute. However, for uniform mechanical loading of the drilling tool, it is more favorable to provide chip space extensions on all flutes.

As a result of the change in shape of the flute caused by the chip space extension according to the invention, the chips are accelerated, thereby favoring chip breaking.

Acceleration should be understood as meaning that the chips undergo a change in momentum. The change in momentum occurs predominantly, on account of the configuration, according to the invention, of the chip space extension, as a change in the direction of movement of the chips, i.e. a chip deflection.

A web has, on the side facing in the direction of rotation, a secondary cutting edge.

The reduction in the web width occurs preferably on the side of the web that faces away from the secondary cutting edge, in order that the shape of the secondary cutting edge remains uninfluenced by the chip space extension. In this way, there is a gentle chip flow.

In other words, the chip space extension according to this development is configured such that only the side of a web that faces counter to a direction of rotation is encroached on by the chip space extension.

In addition to the abovementioned chip deflection, a further advantage of the invention is also that a considerable increase in the chip volume can be created within a short path. A short path means that the chip space extension can be realized along a small angular range—with respect to a course of the helical flutes—or, put another way, within a short segment—with respect to a longitudinal extent of the drilling tool.

This is of particular interest for microdrills, since in this case the chip spaces are correspondingly small and short.

Preferably, a flute opening angle of a flute is increased by the chip space extension. In the context of this application, a flute opening angle is understood to be the particular angle that the opposite flanks of a flute enclose with one another.

Preferably, the chip space extension, as seen from the drill end in the direction of the shank portion, starts only at a distance from the drill end. In other words, it is thus possible for the front part of the cutting-edge portion not to have a chip space extension.

Preferably, the chip space extension starts only at a distance from the drill end of greater than or equal to 1×D, where D is the drill diameter. The advantage of this development is that, in said part of the cutting-edge portion without a chip space extension, the full web width is retained and the drilling tool is more robust in the chip forming region as a result. It has been shown that the portion without a chip space extension should not be too long, since otherwise the favorable effects of the following chip space extension are not fully developed. As a guideline, it was found that the chip space extension should start at most at a distance from the drill end of 8×D, since otherwise the chips become too long.

Preferably, margins are formed on webs at least over a part of the cutting-edge portion. Particularly preferably, margins, as seen from the drill end in the direction of the shank portion, are formed up to a distance from the drill end of less than or equal to 3×D.

Particularly preferably, two margins are formed on a web.

More preferably, the chip space extension, as seen from the drill end in the direction of the shank portion, starts only after the region of the cutting-edge portion in which margins are formed. This has the advantage that the webs have their original width in the region of the margins, this being favorable for guiding and supporting the drill.

Preferably, the extension, achieved by the chip space extension, of the chip space increases along the drill longitudinal axis.

The chip space extension thus does not have to be constant, but rather can increase along the drill longitudinal axis. It is favorable for mechanical reasons for the chip space extension to increase continuously, i.e. not abruptly.

Preferably, wherein the increase in the chip space extension, with respect to a course of the flutes, occurs within less than or equal to 360°. This describes the abovementioned expression that the chip space extension achieves the desired dimension within a short path. At 360°, the chip space extension would thus grow from a starting value to the desired final dimension within one revolution of a helical flute.

With respect to the drill longitudinal axis, the enlargement of the chip space extension can occur for example along a projected segment of less than or equal to 2.5× the drill diameter D.

Preferably, the chip space extension increases along a first projected segment in the direction of the shank portion, and then remains constant along a second projected segment in the direction of the shank portion.

Preferably, the chip space extension is in the form of a ground-in portion. This means that the chip space extension has preferably been introduced by grinding. Alternatively, material could be removed by other methods, such as laser ablation, for instance.

Preferably, the flute has a variable depth in the region of the chip space extension. Depth means a distance from a lateral face of the drilling tool to the bottom of the flute. Preferably, the depth can increase in the direction of the shank portion. This also expresses the fact that the depth and the lateral dimension of the chip space extension are variable independently of one another.

Preferably, at least one coolant duct extending inside the drilling tool has been formed. Via a coolant duct, a coolant/lubricant can be conveyed to the drill end. In this way, the function of the drilling tool is supported particularly advantageously, since the coolant/lubricant further favors the transporting away of chips with reduced friction. Thus, the measures interact particularly advantageously.

Preferably, the drilling tool is made from a composite material comprising at least one hard material and at least one binder phase. In particular, the drilling tool is manufactured from hard metal. Hard metal is understood in the present case to be a composite material in which hard particles, which can be formed in particular by carbides, carbonitrides and/or oxocarbonitrides of elements of groups IVb to VIb of the periodic table of the elements, are embedded in a ductile metal matrix, which can be formed in particular from Co, Ni, Fe or an alloy thereof. In most cases, the hard particles are formed at least predominantly by tungsten carbide and the metal matrix consists substantially of cobalt.

Protection is also sought for a method for producing a drilling tool. In this method, a rotating grinding tool for creating a chip space extension is moved along the flutes, wherein a plane of rotation of the grinding tool is inclined at an angle to the drill longitudinal axis, which angle is greater than the helix angle of the corresponding flute. The grinding tool is guided such that material removal occurs at those sides of the webs that are located at the rear with respect to a direction of rotation.

BRIEF DESCRIPTION OF THE SEVERAL VIEWS OF THE DRAWING

The invention is explained in more detail with reference to the figures, in which.

DETAILED DESCRIPTION OF THE INVENTION

Figure 1:
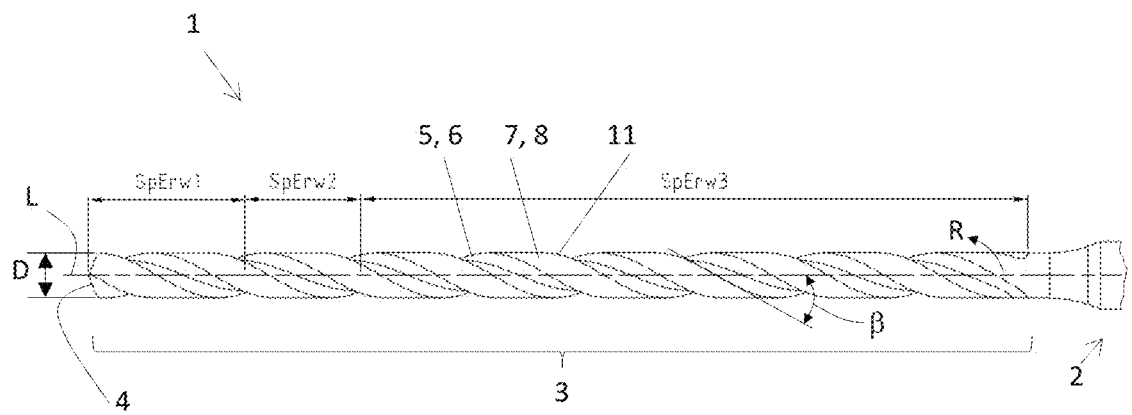
FIG. 1 shows an exemplary embodiment of the invention

FIG. 1 shows a drilling tool 1 in the form of a twist drill with a substantially cylindrical main body with a drill diameter D, which has a shank portion 2 and a cutting-edge portion 3. The shank portion 2 is illustrated only in part. In use, the drilling tool 1 rotates in a direction of rotation R with the longitudinal axis L as axis of rotation. The present drilling tool 1 is thus embodied in a clockwise manner.

The drilling tool 1 has a drill end 4 (also: drill tip) on which main cutting edges are formed.

Formed along the drilling tool 1 are helically extending flutes 5. In the present example, there are two diametrically opposite flutes 5. Alternatively, flutes 5 can also be arranged in an asymmetric manner. There could also be more than two flutes 5.

The flutes 5 extend at a helix angle β to the longitudinal axis L of the drilling tool 1. Preferably, both flutes 5 exhibit the same helix angle.

Between the flutes 5 there is a web 7. The surface of the web 7, which determines a lateral face of the drilling tool 1, is referred to as the land 8.

The edge formed by a flute 5 and the web 7 and located in the direction of rotation R is referred to as the secondary cutting edge 11.

For explanatory purposes, the cutting-edge portion 3 is divided into three subportions:

Along a segment SpErw1 from the drill end 4, no chip space extension 9 is formed. The length of the first segment SpErw1 from the drill end 4 without a chip space extension 9 is preferably greater than or equal to 1×D, where D is the drill diameter.

After the first segment SpErw1 a chip space extension 9 starts, which increases along a second projected segment SpErw2 in the direction of the shank portion 3 and then remains constant along a third projected segment SpErw3 in the direction of the shank portion 3. The length of the first segment SpErw1 is 2.5×D in the present example, and the length of the segment SpErw2 is 2.6×D in the present example.

Figure 2A:
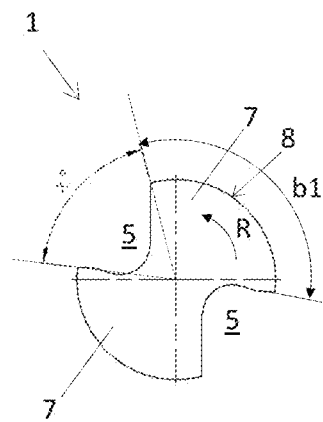
FIGS. 2a-c show cross sections of the drilling tool from FIG. 1 at different points along the longitudinal axis
Figure 2B:
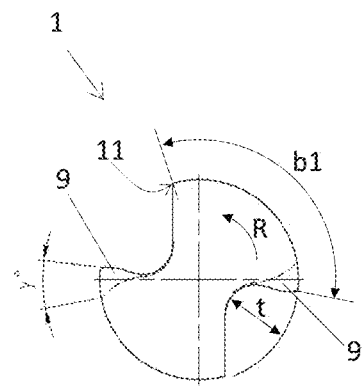
Figure 2C:
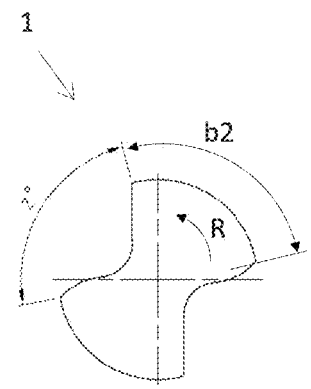

In FIGS. 2a to 2c thereneath, the cross sections of the drilling tool 1 corresponding to the three subportions are illustrated.

FIG. 2a shows a cross section of the drilling tool 1 in the region of the first segment SpErw1 without a chip space extension 9. The shape and depth of the flutes 5 therefore corresponds to the original tool grinding in this illustration.

The flute 5 without a chip space extension 9 has a flute opening angle of x°, in this example about 68°. The flute opening angle is the name given to the angle between the legs, indicated by dashed reference lines, which connect a center of the drilling tool 1 and an edge between the flute 5 and land 8. The reference signs are not repeated in the following figures for the sake of clarity.

FIG. 2b shows a cross section of the drilling tool 1 at a distance SpErw1 from the drill end 4. Indicated by dashed lines is the enlargement of the flute opening angle as a measure for the chip space extension 9 along the segment SpErw2 about the angle y°, in this example 18°. Along the segment SpErw2, the chip space of the flute 5 increases continuously in size, expressed via the flute opening angle, from a starting value of in this case x°, and amounts to x°+y°=z° at the end of the segment SpErw2.

The chip space extension 9 consists of a removal of material on the side of a web 7 that faces counter to the direction of rotation (R), such that a web width b is reduced in the region of the chip space extension 9. The web is thus narrower in the region of the chip space extension 9 than in a portion of the drilling tool 1 in which no chip space extension 9 has been formed.

The web width b can be determined for example by an optical measurement method.

The edge between the land 8 and the flute 5 in the direction of rotation R carries forms a secondary cutting edge 11 of the drilling tool 1 and is not influenced by the chip space extension 9.

Alternatively, the chip space extension 9 could encroach on the webs 7 on both sides of the flute. However, for a gentle chip flow, it is more favorable for the secondary cutting edge 11 to remain unaffected by the chip space extension 9.

Also apparent is a depth t of the flute 5, which remains unchanged in this example.

FIG. 2c shows a cross section of the drilling tool 1 in the region of the third portion SpErw3. In this case, the flute opening angle is constantly z°, where z=86°.

It is also apparent that the chip space extension 9 occurs at the cost of the webs 7 on the side facing counter to the direction of rotation R. The web width b has been reduced to the value b2 compared with the value b1 of the situation in FIG. 2a.

A depth t of the flutes 5 remains unchanged in this exemplary embodiment. In other words, a core diameter is not reduced. It is also possible for the depth t of the flutes 5 to increase in addition to the described lateral extension of the flutes.

Figure 3:
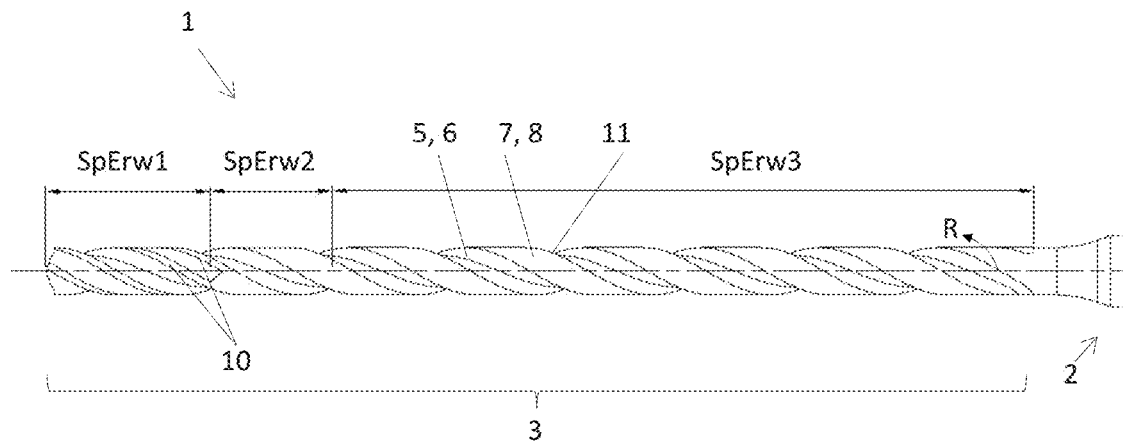
FIG. 3 shows a drilling tool in a further exemplary embodiment

FIG. 3 shows a drilling tool 1 according to a further exemplary embodiment. The reference signs correspond to FIG. 1. In contrast to the example according to FIG. 1, margins 10 have been formed on the webs 7 here and on the segment SpErw1. Margins 10 bring about favorable guidance and support of the drilling tool 1 with low friction.

The margins 10 are realized here by a recess in the land 8, such that, per web 7, one margin 10 is present on the secondary cutting edge 11 and a further margin 10 is present on the side of the web 7 that faces counter to the direction of rotation R.

In this preferred exemplary embodiment, the chip space extension 9 starts only after the portion of the cutting-edge portion 3 in which the margins 10 are formed. This has the advantage that the web width b has an unchanging width in the region of the margins 10, with the result that favorable support of the drilling tool 1 is achieved. Thus, support is provided by the margins 10 over a greater angular range compared with margins 10 on a web 7 with a reduced web width b.

Figures 4A, 4B, 4C:
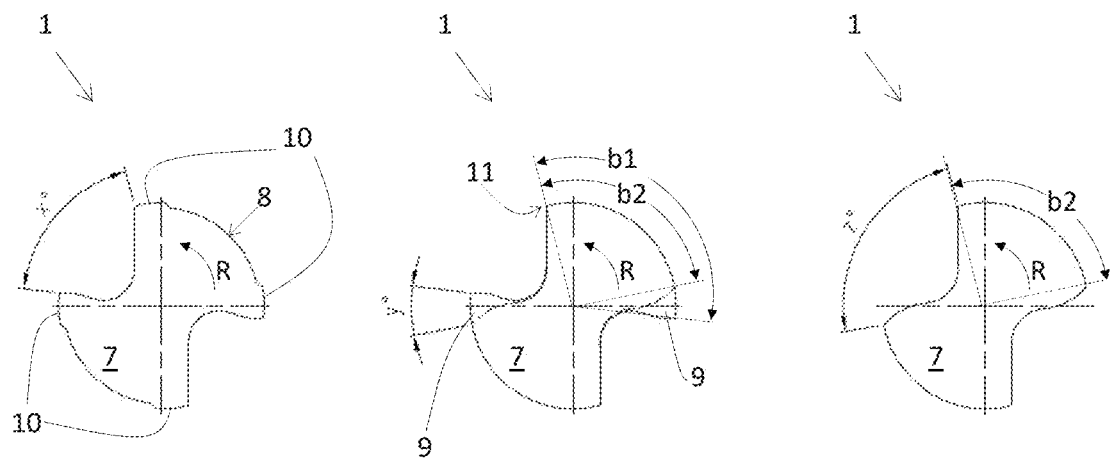
FIGS. 4a-c show cross sections of the drilling tool from FIG. 3 at different points along the longitudinal axis

The proportions are even more clearly apparent from FIG. 4a. FIG. 4a shows a cross section of the drilling tool 1 in the region of the segment SpErw1 on which the margins 10 are formed. It is apparent that the margins 10 have been formed by a recess in the land 8. The margins 10 are distributed at angular spacings of about 90° around the circumference of the drilling tool 1, resulting in even support and guidance of the drilling tool 1.

The length of the segment SpErw1 on which the margins 10 are formed is 3.5× the drill diameter D in the present example.

FIG. 4b shows a section in the portion SpErw2 in which the chip space extension 9 starts. The chip space extension 9—as in the previous exemplary embodiment—is embodied such that the web width b is reduced on a web 7 on the side facing counter to the direction of rotation 7. In other words, the secondary cutting edge 11 remains unaffected by the chip space extension 9. The web width b of the web 7 is thus not reduced from both sides. The web width b is reduced along the portion SpErw2 from the original value b1 to the value b2. In the portion SpErw2, no margins are formed on the webs 7.

FIG. 4c shows a cross section of the drilling tool 1 in the region of the third portion SpErw3. The web width b has been reduced to the value b2 compared with the value b1 of the situation in FIG. 4a.

For the flute opening angle, what was discussed in respect of FIGS. 2a-c applies.

Figure 5A:
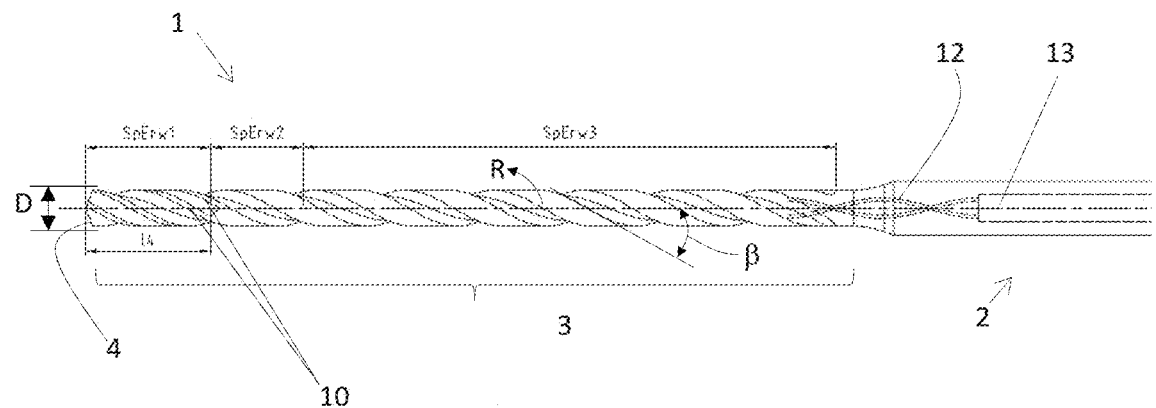
FIGS. 5a, 5b show drilling tools in further exemplary embodiments

FIG. 5a shows a drilling tool 1 according to a further exemplary embodiment.

In this case, coolant ducts 12 extending inside the drilling tool 1 are provided. In the region of the segment 14, margins 10 are formed. As far as the remaining reference signs are concerned, what was stated for the previous exemplary embodiments applies.

A coolant/lubricant can be conveyed to the drill end 4 through the coolant ducts 12. The coolant ducts 12 extend in a manner twisted at a spiral angle with respect to the longitudinal axis L.

As a result of the coolant/lubricant that is able to be conveyed to the drill end 4 via coolant ducts 12, the function of the drilling tool 1 according to the invention is supported in a particularly advantageous manner, since the coolant/lubricant further favors the transporting away of chips.

Furthermore, a distribution chamber 13 for the coolant/lubricant is provided in the shank portion 2. Via the distribution chamber 13, the coolant/lubricant can be transferred advantageously to the drilling tool 1 from a clamp (not shown). This embodiment having a distribution chamber 13 is of interest in particular for particularly long tools and/or tools with small diameters, in order to keep a flow resistance for the coolant/lubricant low.

Figure 5B:
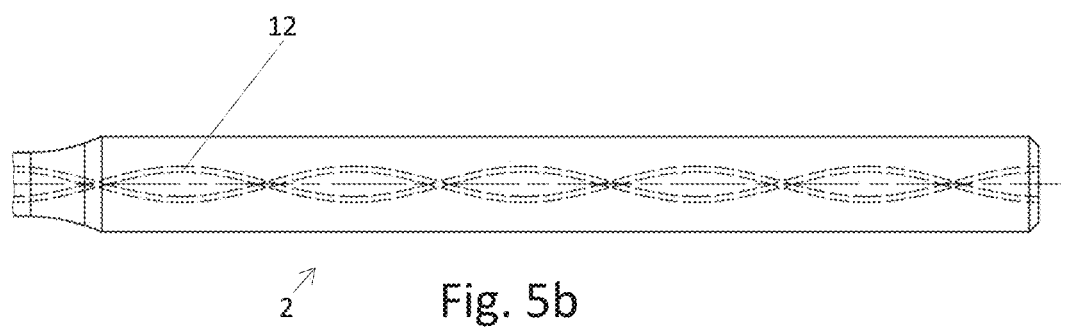

FIG. 5b shows a detail of a drilling tool 1 according to a further exemplary embodiment. Here, in contrast to the exemplary embodiment in FIG. 5a, no distribution chamber 13 is provided in the shank portion 2. Rather, the coolant ducts 12 extend along the entire length of the drilling tool 1.

Figures 6A, 6B, 6C:
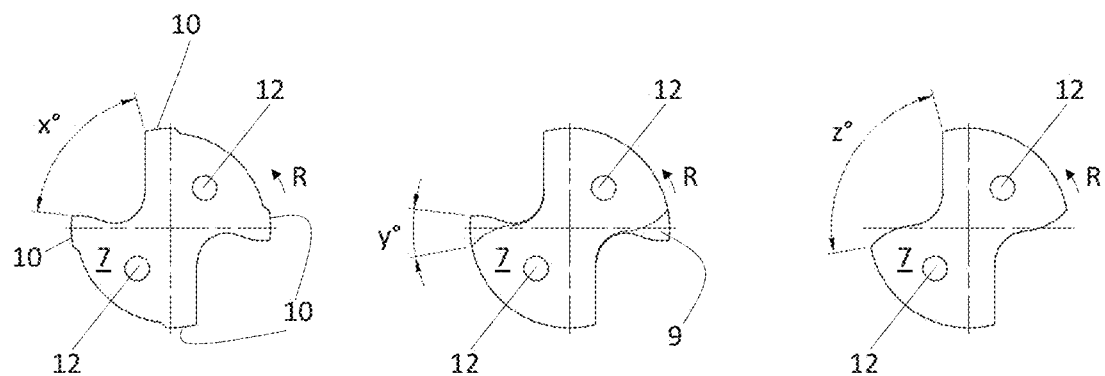
FIGS. 6a-c show cross sections of the drilling tool from FIG. 5 at different points along the longitudinal axis

FIGS. 6a to 6c show cross sections of drilling tools 1 with coolant ducts 12.

FIG. 6a shows a cross section of the drilling tool 1 in the region of the segment 14, along which the margins 10 are formed. In the cross section of the drilling tool 1, the internal coolant ducts 12 can be seen. The coolant ducts 12 have a circular cross section in this example.

FIG. 6b shows a section in the portion SpErw2, in which the chip space extension 9 starts. The chip space extension 9—as in the previous exemplary embodiments—is embodied such that the web width b is reduced on a web 7 on the side facing counter to the direction of rotation 7.

It is favorable when the coolant ducts 12 are arranged so as to be sufficiently far from the chip space extension 9, in order not to weaken the web 7 in the region of the coolant ducts 12.

FIG. 6c shows a cross section of the drilling tool 1 in the region of the third portion SpErw3.

The presence of coolant ducts 12 is independent of any presence of margins 10. There can thus be drilling tools 1 with coolant ducts 12 without margins 10.

Figure 7:
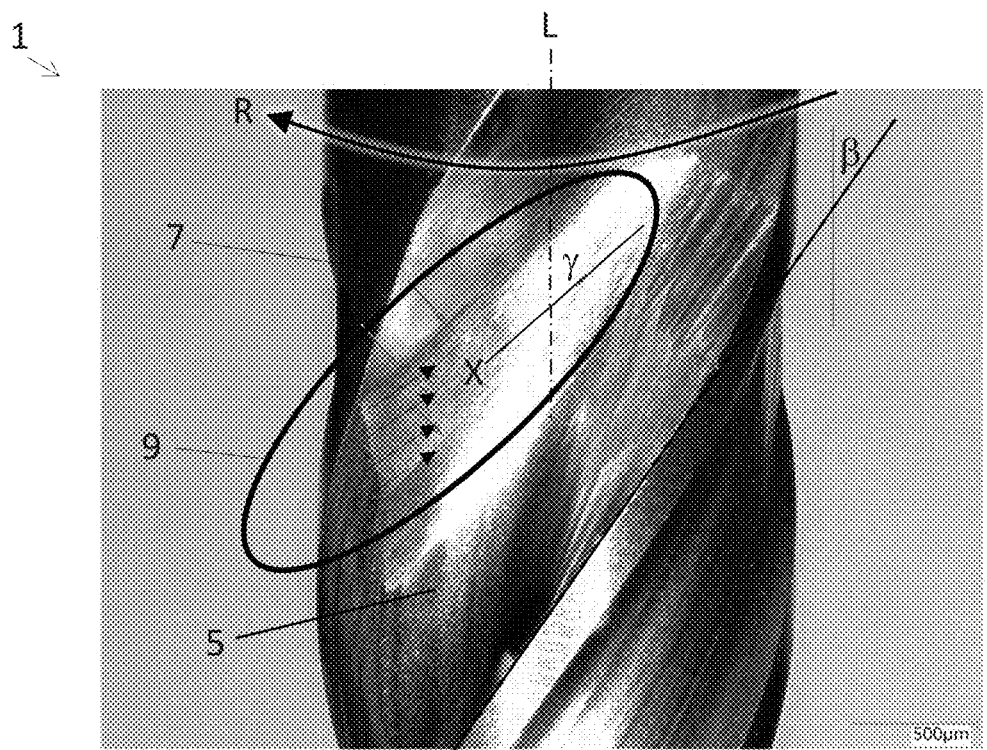
FIGS. 7, 8 show photographs of a drilling tool according to the invention

FIG. 7 shows a photograph of a drilling tool 1 according to the invention. Highlighted is the chip space extension 9, which is formed at the cost of the webs 7 on the side facing counter to the direction of rotation R.

Arrows identify grinding grooves that have been created by the engagement of a rotating grinding tool (not shown), in particular a profile grinding wheel. The chip space extension 9 created by the engagement of the grinding tool has a main direction of extent X, which extends at an angle γ to the drill longitudinal axis L, wherein the angle γ is greater than the helix angle β of the corresponding flute 5.

The chip space extension 9 is produced preferably by the engagement of the grinding tool such that a plane of rotation of the grinding tool is placed at an angle γ to the longitudinal axis L of the drilling tool 1 and then is moved, following the flute 5, with respect to the drilling tool 1 such that webs 7 are partially removed on the side facing counter to the direction of rotation R.

Figure 8:
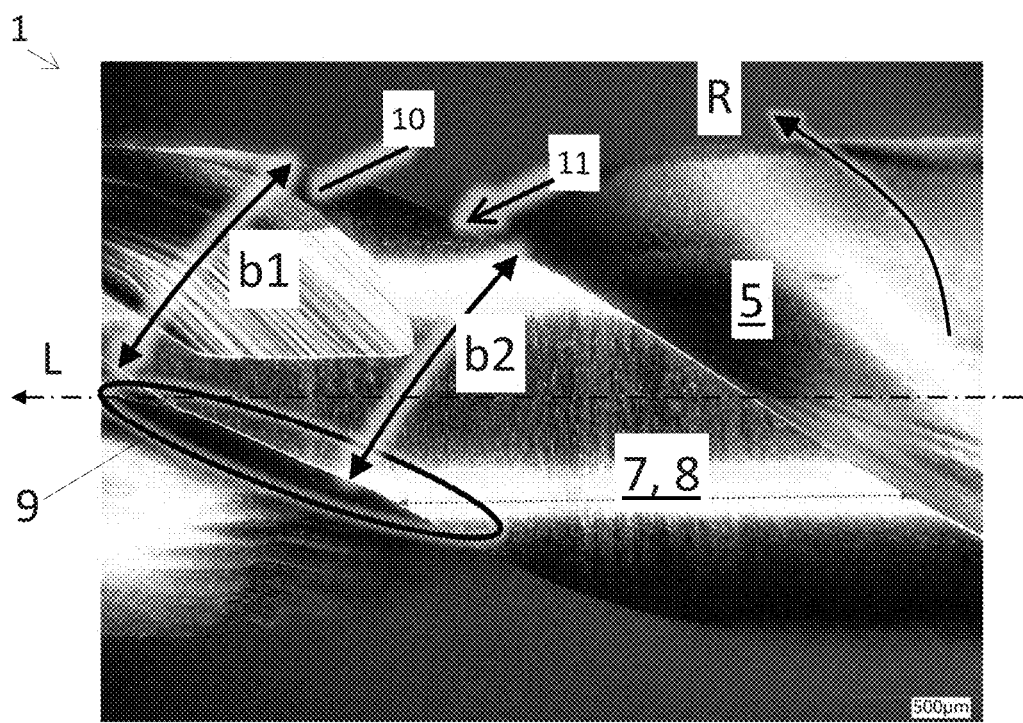

FIG. 8 shows a further photograph of a drilling tool 1 according to the invention. It is apparent that, in the region of the chip space extension 9, a web width b2 of the web 7 has been reduced compared with a region in front of it in the longitudinal direction with a web width b1.

LIST OF REFERENCE SIGNS

1 Drilling tool
2 Shank portion
3 Cutting-edge portion
4 Drill end
5 Flute
6 Chip space
7 Web
8 Land
9 Chip space extension
10 Margin
11 Secondary cutting edge
12 Coolant duct
13 Distribution chamber
D Drill diameter
L Longitudinal axis
R Direction of rotation
b Web width
t Depth of the chip space extension
β Helix angle
γ Angle of the main direction of extent of the chip space extension

The invention claimed is:

1. A drilling tool, comprising:
a substantially cylindrical main body having a shank portion, a cutting-edge portion with a drill diameter, and a drill end, said main body being a hard metal;
said main body defining a drill longitudinal axis about which the drilling tool is rotatable in a direction of rotation;
said cutting-edge portion being formed with at least two helical flutes that extend in a twisted manner along the drill longitudinal axis with an inclination defining at least one helix angle, and webs with a given web width formed between said flutes, and said cutting-edge portion having a first, second, and third projected segment along the drill longitudinal axis from said drill end to said shank portion;
said cutting-edge portion being formed with margins over at least a portion said first projected segment of said cutting-edge portion, at least one margin of said margins being formed on the web along a secondary cutting edge;
said flutes forming a chip space therebetween and said chip space having a chip space extension for enlarging the chip space introduced into at least a portion of at least one of said flutes in said second projected segment and said third projected segment and after the first projected segment in which said margins are formed, wherein said margins end prior to the introduction of said chip space extension at said second projected segment, and wherein the web width is reduced in the region of the chip space extension.

2. The drilling tool according to claim 1, wherein said chip space extension is configured such that only a side of a web that faces counter to the direction of rotation is encompassed by the chip space extension.

3. The drilling tool according to claim 1, wherein said chip space extension is formed to increase a flute opening angle of a respective flute.

4. The drilling tool according to claim 1, wherein a length of said first projected segment from said drill end to said second projected segment is greater than or equal to the drill diameter.

5. The drilling tool according to claim 1, wherein an extent of said chip space, achieved by said chip space extension, increases along the drill longitudinal axis.

6. The drilling tool according to claim 5, wherein said chip space extension enlarges the chip space along the drill longitudinal axis with respect to a course of said flutes within less than or equal to 360° over a rotation about the drill longitudinal axis.

7. The drilling tool according to claim 6, wherein the enlarging of said chip space, with respect to the drill longitudinal axis, occurs along said second projected segment, and a length of said second projected segment is less than or equal to 2.5× the drill diameter.

8. The drilling tool according to claim 5, wherein the enlarging of said chip space, with respect to the drill longitudinal axis, occurs along said second projected segment which is less than or equal to 2.5× the drill diameter.

9. The drilling tool according to claim 5, wherein said chip space extension increases along said second projected segment in a direction of said shank portion, and then remains constant along said third projected segment in the direction of said shank portion.

10. The drilling tool according to claim 1, wherein said chip space extension is in the form of a ground-in portion.

11. The drilling tool according to claim 1, wherein a flute has a variable depth in the region of the chip space extension.

12. The drilling tool according to claim 1, wherein an interior of said main body is formed with at least one coolant duct extending inside the drilling tool.

13. The drilling tool according to claim 1 formed as a twist drill bit.

* * * * *